(12) United States Patent
Imai

(10) Patent No.: US 7,793,962 B2
(45) Date of Patent: Sep. 14, 2010

(54) MAIN STAND FOR MOTORCYCLE

(75) Inventor: Ryoji Imai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 221 days.

(21) Appl. No.: 11/959,961

(22) Filed: Dec. 19, 2007

(65) Prior Publication Data

US 2008/0157503 A1 Jul. 3, 2008

(30) Foreign Application Priority Data

Dec. 28, 2006 (JP) .............................. 2006-355402

(51) Int. Cl.
*B62H 1/02* (2006.01)
(52) U.S. Cl. ...................................... 280/301; 180/219
(58) Field of Classification Search ................. 280/301; 180/219
See application file for complete search history.

(56) References Cited

U.S. PATENT DOCUMENTS

| 4,445,705 A | * | 5/1984 | Hayashi et al. | ............. 280/302 |
| 4,582,336 A | * | 4/1986 | Onoda | ......................... 280/293 |
| 4,655,472 A | * | 4/1987 | Pletscher | .................... 280/303 |
| 4,660,847 A | * | 4/1987 | Yagasaki | .................... 280/298 |
| 6,964,426 B2 | * | 11/2005 | Kuboshima et al. | ......... 280/301 |
| 2003/0111823 A1 | * | 6/2003 | Kuboshima et al. | ......... 280/301 |

FOREIGN PATENT DOCUMENTS

| DE | 103 17 671 A1 | 10/2004 |
| DE | 10317671 | * 10/2004 |
| JP | 52-139252 A | 11/1977 |
| JP | 55-76774 | * 11/1978 |
| JP | 55-76774 U | 5/1980 |
| JP | 58-4676 A | 1/1983 |
| JP | 58-45180 U | 3/1983 |
| JP | 61-175186 A | 8/1986 |
| JP | 61-191481 A | 8/1986 |
| JP | 5-238440 A | 9/1993 |

* cited by examiner

*Primary Examiner*—Kevin Hurley
*Assistant Examiner*—Michael R Stabley
(74) *Attorney, Agent, or Firm*—Westerman, Hattori, Daniels & Adrian, LLP

(57) ABSTRACT

A main stand for a vehicle (e.g., a motorcycle) includes a bar-like member rotatably disposed on a vehicle body frame of the motorcycle, a lever rotatably disposed on the vehicle body frame, a cam rotated integrally with the lever, and a cam rest disposed on an upper portion of the bar-like member. The cam rest is pressed by the cam as the lever is rotated to bring the bar-like member to an upright position to raise a wheel off a ground. The lever is rotated by an occupant of the vehicle.

4 Claims, 9 Drawing Sheets

MAIN STAND FOR MOTORCYCLE

FIELD OF THE INVENTION

The present invention relates to an improved main stand for a motorcycle.

BACKGROUND OF THE INVENTION

A known main stand for a motorcycle includes leg stands rotatably mounted on a vehicle body frame via a shaft. The leg stands are brought into an erected position so that a wheel can be raised off the ground (see, for example, FIGS. 2 and 4 of Japanese Utility Model Laid-open No. Sho 55-76774 (JP '774).)

Referring to FIG. 2 of JP '774, the main stand includes a leg stand 1, a link body 3, a holding tab 6, a cam 11, a lever 10, a foothold 13, and a stopper 8. More specifically, the link body 3 is swingably attached to an upper end of the leg stand 1 via a shaft 2. The holding tab 6 is disposed on the side of a vehicle body 5, connected to the link body 3 via a shaft 4. The cam 11 is disposed on the holding tab 6 via a shaft 9, pressing the link body 3. The lever 10 with the foothold 13 is fitted to the cam 11 and rotates the cam 11. The stopper 8 defines the position of the leg stand 1 when the leg stand 1 is brought into the erected position. In FIG. 2 of JP '774, reference numerals 3 and 12 represent springs.

Referring to FIG. 4 of JP '774, the main stand includes left and right link bodies 3, 3 and cams 11, 11 pressing the link bodies 3, 3. When the main stand is erected for use, the leg stand 1 is operated into a temporary erected position. Then, the lever 10 is operated to rotate the cams 11, 11, thereby pressing the link bodies 3, 3. The leg stand 1 can thereby be brought into the erected position with a small force.

The main stand according to JP '774 has the cam 11 and the link body 3 on each of the left and right-hand sides. As a result, the large number of elements involved leads to a complicated structure. Further, the large number of elements involved increases the weight of the main stand. This is not preferable from a viewpoint of effort made toward reduction in vehicle weight.

Moreover, bringing the main stand into the erected position involves two troublesome steps of operating the leg stand 1 and then operating the lever 10.

SUMMARY OF THE INVENTION

It is an object of the present invention to provide, in a main stand that can be operated with an even smaller force, a main stand having a simplified structure for greater reduction in weight and improved operability.

According to a first aspect of the present invention, there is provided a main stand for a motorcycle having a bar-like member rotatably disposed on a vehicle body frame via a shaft member, the bar-like member being brought to an upright position to thereby raise a wheel off a ground. The main stand includes a lever, a cam, and a cam rest. The lever is rotatably disposed on the vehicle body frame. The lever is operated by an occupant as he or she attempts to bring the bar-like member to the upright position. The cam is rotated integrally with the lever. The cam rest is disposed on the bar-like member. Then, the cam rest is pressed by the cam as the lever is rotated to thereby bring the bar-like member to the upright position.

In accordance with the first aspect of the present invention, the main stand has a simple structure including the lever, the cam that rotates integrally with the lever, and the cam rest pressed by the cam disposed on the bar-like member. The main stand is thus simply structured. This makes it possible to promote further reduction in weight in the main stand that has a function of bringing the bar-like member to the upright position with an even smaller force.

In addition, the main stand can be deployed by only rotatably operating the lever. The operation is therefore so simple that the main stand achieves an improved operability.

According to a second aspect of the present invention, the cam rest includes a roller that abuts on the cam.

In accordance with the second aspect of the present invention, the cam rest includes the roller that abuts on the cam. Force is therefore transmitted from the cam to the cam rest via the roller and the roller is rotated as the cam moves. Specifically, rolling motion is involved between the cam and the cam rest. As compared with sliding motion, friction loss can be reduced between the cam and the cam rest.

The reduced friction loss results in the main stand being erected with an even smaller force.

According to a third aspect of the present invention, the cam is formed such that an angle of rotation of the bar-like member is greater than an angle of rotation of the lever when the bar-like member is close to a collapsed position thereof.

In accordance with the third aspect of the present invention, the cam is formed such that, in erecting the bar-like member, the angle of rotation of the lever is greater than the angle of rotation of the bar-like member in an area, in which the bar-like member is close to the collapsed position, requiring no large force for rotatable operation, than when the bar-like member is close to the upright position. As a result, the bar-like member can be quickly rotated in a first part of the erecting operation.

According to a fourth aspect of the present invention, the cam is formed such that the angle of rotation of the bar-like member is smaller than the angle of rotation of the lever after the bar-like member has contacted the ground.

In accordance with the fourth aspect of the present invention, in erecting the bar-like member, the cam is formed such that the angle of rotation of the bar-like member is smaller than the angle of rotation of the lever in an area, in which the bar-like member is after the grounded position and close to the upright position, requiring a large force for rotatable operation. As a result, the bar-like member can be rotated with even a smaller force in a second part of the erecting operation. This allows the bar-like member to be brought into the upright position with an even smaller force.

BRIEF DESCRIPTION OF THE DRAWINGS

A preferred embodiment of the present invention will be described hereinafter with reference to the accompanying drawings.

DETAILED DESCRIPTION OF THE INVENTION

Figure 1:
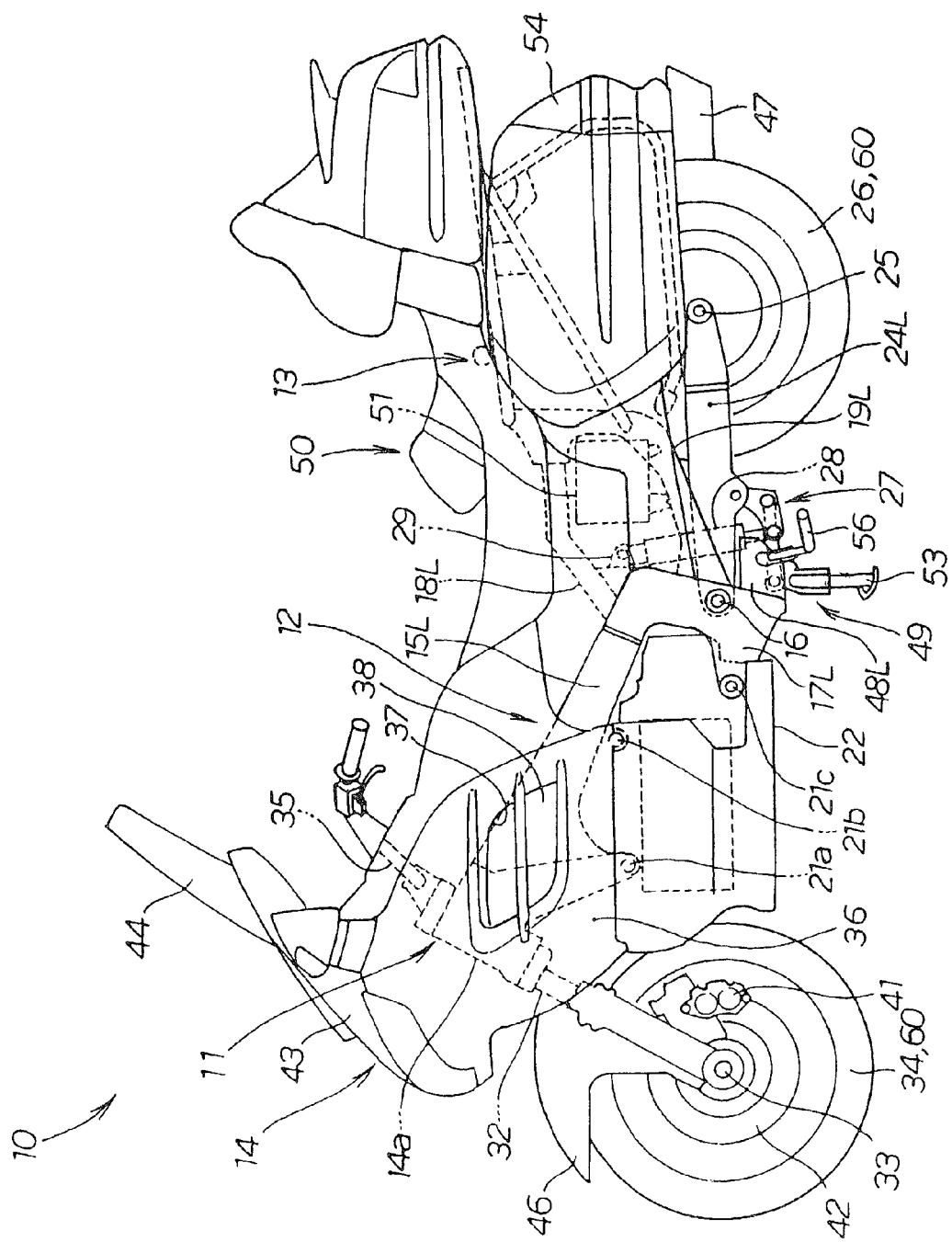
FIG. 1 is a left side elevational view showing a motorcycle according to an embodiment of the present invention.

Embodiments of the invention will be described below with reference to the accompanying drawings. The drawings should be viewed in the direction of reference numerals.

FIG. 1 is a left side elevational view showing a motorcycle according to an embodiment of the present invention. A motorcycle 10 includes a vehicle body frame 11. The vehicle body frame 11 includes a vehicle body frame main body 12 and a rear vehicle body frame 13 connected to the vehicle body frame main body 12.

The vehicle body frame main body 12 includes, as main elements thereof, a pair of left and right main frames 15L, 15R (only reference numeral 15L representing the main frame on a proximal side is shown), a pair of left and right pivot plates 17L, 17R (only reference numeral 17L representing the pivot plate on the proximal side is shown), a pair of left and right seat rails 18L, 18R (only reference numeral 18L representing the main frame on the proximal side is shown), and a pair of left and right middle frames 19L, 19R (only reference numeral 19L representing the middle frame on the proximal side is shown). The main frames 15L, 15R extend rearwardly from a head pipe 14a that constitutes a front portion of a vehicle body 14. The pivot plates 17L, 17R are mounted to a rear end of the main frames 15L, 15R and have a pivot 16. The seat rails 18L, 18R rise from upper portions of the pivot plates 17L, 17R and then extend rearwardly. The middle frames 19L, 19R connect rear ends of the seat rails 18L, 18R and middle portions of the pivot plates 17L, 17R and support the seat rails 18L, 18R. The rear vehicle body frame 13 will be described in details with reference to FIG. 2.

An engine 22 is suspended downwardly of the main frames 15L, 15R via fastening members 21a to 21c. The engine 22 is a horizontally opposed, 6-cylinder, water-cooled engine.

A pair of left and right rear swing arms 24L, 24R (only reference numeral 24L representing the rear swing arm on the proximal side is shown) is attached to the pivot plates 17L, 17R. The rear swing arms 24L, 24R are vertically swingable about the pivot 16. A rear wheel 26 is rotatably mounted on rear ends of the rear swing arms 24L, 24R via a rear wheel axle 25. The rear wheel 26 is driven through a driving force of the engine 22.

A rear cushion unit 28 is disposed in a standing condition at middle portions of the rear swing arms 24L, 24R via a linkage mechanism 27. The rear cushion unit 28 has an upper end attached to a bracket 29 formed on the side of the main frame 15.

A front fork 32 is steerably mounted to the head pipe 14a. A front wheel 34 is mounted on the front fork 32 via a front wheel axle 33. A steering handlebar 35 is mounted on an upper end of the front fork 32.

An opening 37 is formed sideways a main cowl 36 sideways a front portion of the main frames 15L, 15R. A radiator unit 38 for cooling the engine 22 is disposed so as to face the opening 37.

Referring to FIG. 1, reference numeral 41 denotes a front disc brake unit. Reference numeral 42 denotes a front disc plate. Reference numeral 43 denotes a front cowl covering forward of the vehicle. Reference numeral 44 denotes a front shield. Reference numeral 46 denotes a front fender. Reference numeral 47 denotes a muffler. Reference numerals 48L, 48R denote a pair of left and right main stand brackets. Reference numeral 49 denotes a main stand. Reference numeral 50 denotes a seat on which an occupant sits. Reference numeral 51 denotes a battery.

Figure 2:
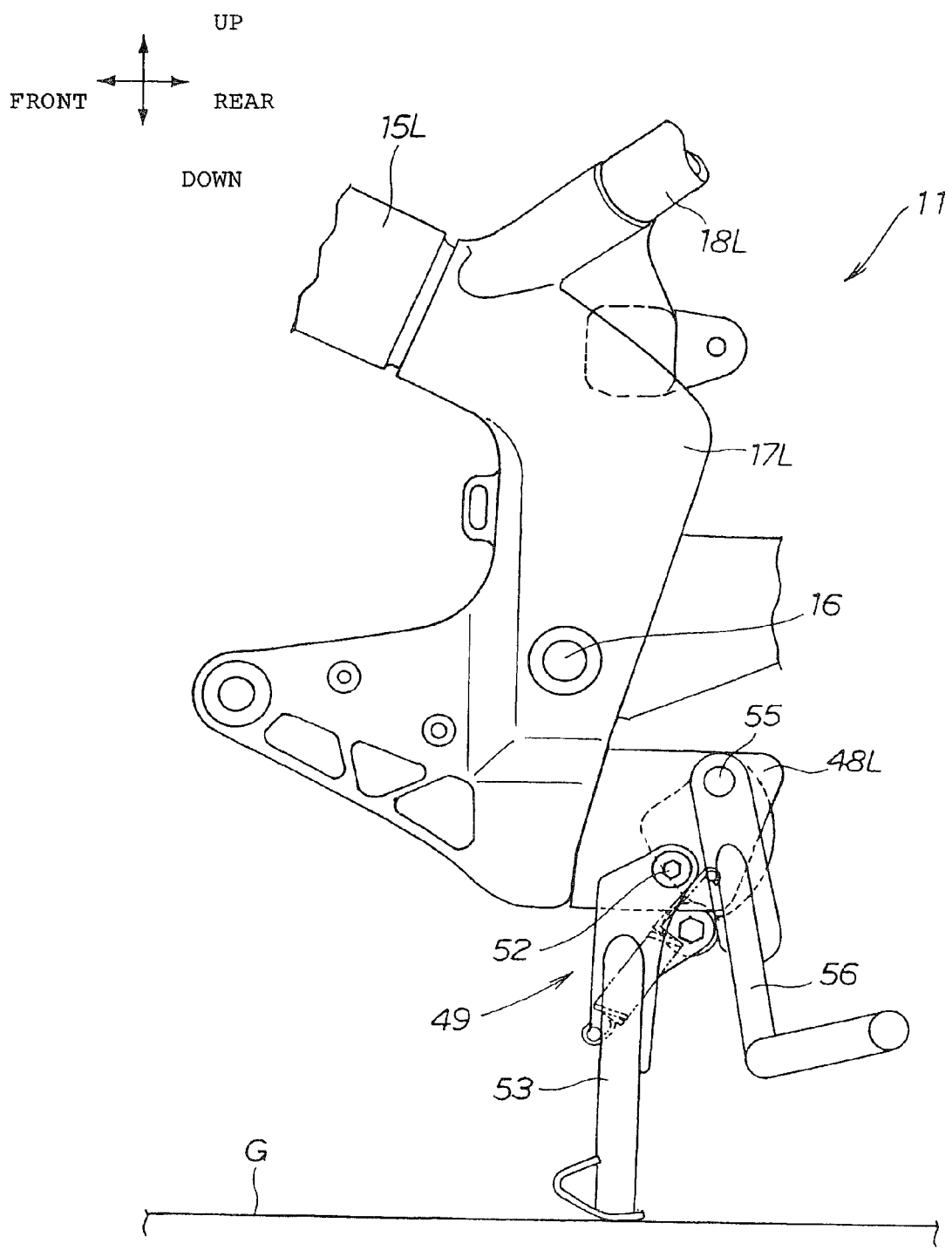
FIG. 2 is a side elevational view showing a main stand and areas surrounding the main stand according to the embodiment of the present invention.

FIG. 2 is a side elevational view showing the main stand 49 and areas surrounding the main stand 49 according to the embodiment of the present invention. The pivot plates 17L, 17R that support the pivot 16 are connected to the rear ends of the main frames 15L, 15R. The seat rails 18L, 18R are extended from the upper portions of the pivot plates 17L, 17R. The main stand brackets 48L, 48R are extended rearwardly from the lower portions of the pivot plates 17L, 17R.

The construction of main stand 49 is described. Specifically, a shaft member 52 is mounted, in a direction from a front side to a backside of FIG. 2, to the main stand brackets 48L, 48R that forms part of the vehicle body frame 11. A bar-like member 53 serving as a leg stand is rotatably disposed on the main stand brackets 48L, 48R via the shaft member 52. The bar-like member 53 is then erected to allow wheels (reference numeral 60 in FIG. 1) to be raised off the ground. The main stand 49 is thus capable of holding the vehicle body 14 stably in an upright condition. The wheels 60 mean the rear wheel 26 and the front wheel 34 shown in FIG. 1.

Figure 3:
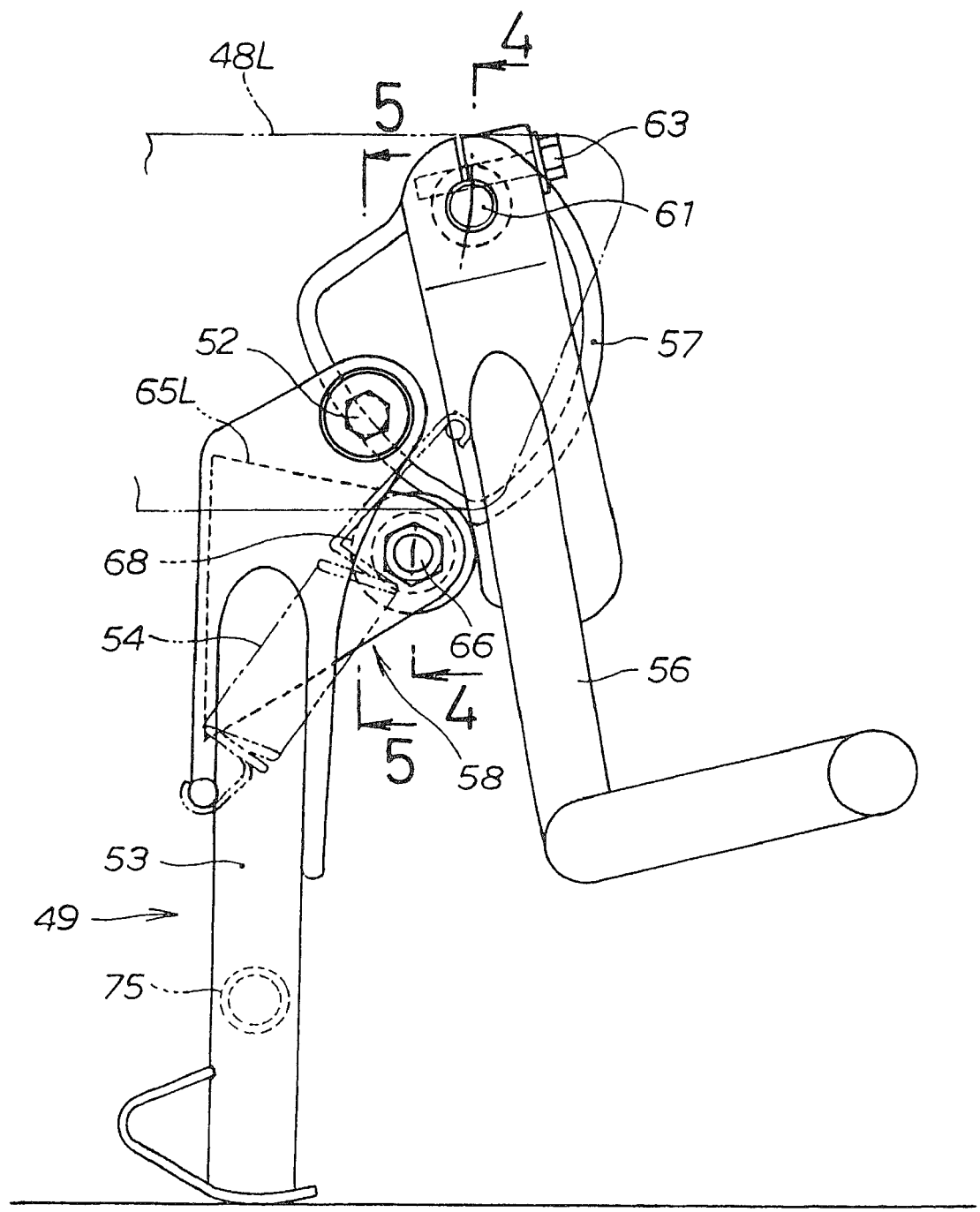
FIG. 3 is an enlarged view showing a portion of the main stand shown in FIG. 2.
Figure 4:
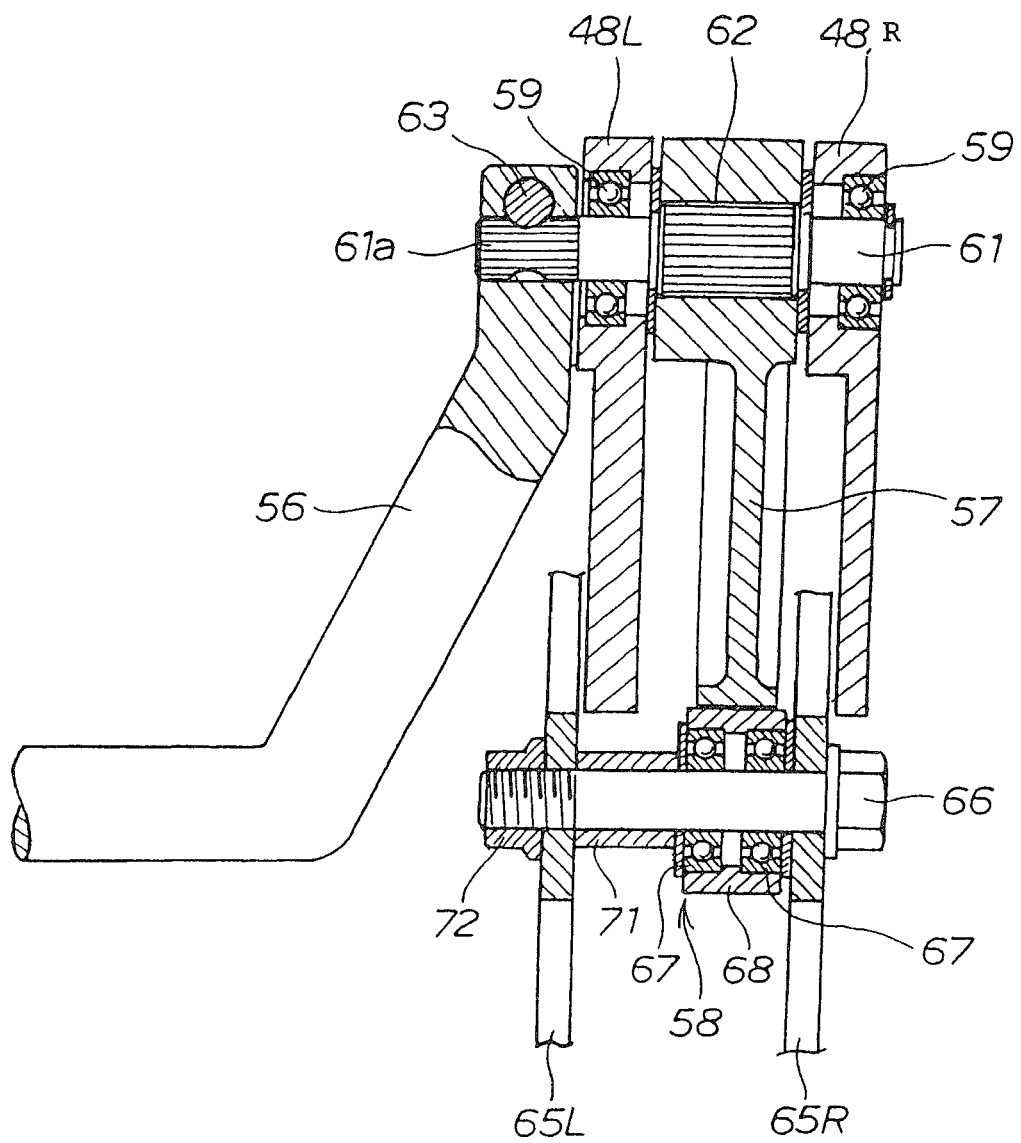
FIG. 4 is a cross-sectional view taken along line 4-4 of FIG. 3.

FIG. 3 is an enlarged view showing a principal portion of the main stand 49 shown in FIG. 2. FIG. 4 is a cross-sectional view taken along line 4-4 of FIG. 3. The main stand 49 will be described below with reference to FIGS. 3 and 4. A spring member 54 hooked across the bar-like member 53 and the main stand bracket 48L is shown by an imaginary line to help make a cam mechanism easier to understand.

The main stand 49 includes a camshaft 61, a lever 56, a cam 57, the shaft member 52, the bar-like member 53, a cam rest 58, and the spring member 54. The camshaft 61 is disposed across the main stand brackets 48L, 48R. The lever 56, disposed coaxially with the camshaft 61, is operated when the occupant deploys the main stand 49. The cam 57 is rotated integrally with the lever 56. The shaft member 52 is disposed downwardly of the camshaft 61 and mounted in the main stand brackets 48L, 48R. The bar-like member 53 serves as the leg stand disposed rotatably on the shaft member 52. The cam rest 58 extended rearwardly from the bar-like member 53 includes a roller 68. The spring member 54, hooked across the bar-like member 53 and the main stand brackets 48L, 48R, functions to hold the bar-like member 53 in a collapsed position. The cam 57 is thereby adapted to abut on the cam rest 58.

The camshaft 61 is rotatably mounted via bearings 59, 59 across a left main stand bracket 48L and an intermediate main stand bracket 48R disposed inwardly of the left main stand bracket 48L. The lever 56, which rotates about the camshaft 61, is mounted on a first end 61a of the camshaft 61 at a position outboard the vehicle. A splined portion 62 is formed at an intermediate portion of the camshaft 61 between the left main stand bracket 48L and the intermediate main stand bracket 48R. The cam 57 rotating integrally with the camshaft 61 is mounted on the splined portion 62. In FIGS. 3 and 4, reference numeral 63 denotes a small bolt fixing the lever 56 to the camshaft 61.

The cam rest 58 includes a pair of left and right receiver members 65L, 65R, a receiver shaft 66, and the roller 68. The receiver members 65L, 65R are extended rearwardly and horizontally from the bar-like member 53. The receiver shaft 66 is mounted across the receiver members 65L, 65R. The roller 68 is rotatably mounted on the receiver shaft 66 via bearings 67, 67. In accordance with the embodiment of the present invention, a bolt is used for the receiver shaft 66. In FIG. 4, reference numeral 71 denotes a spacer and reference numeral 72 denotes a nut for securing the receiver shaft 66 to the receiver members 65L, 65R.

Specifically, the cam rest 58 includes the roller 68 that abuts on the cam 57. The cam rest 58 is thereby constructed such that the cam 57 presses the roller 68 of the cam rest 58 as the lever 56 is rotated and the bar-like member 53, which rotates integrally with the roller 68 of the cam rest 58, is brought into an upright position.

Figure 5:
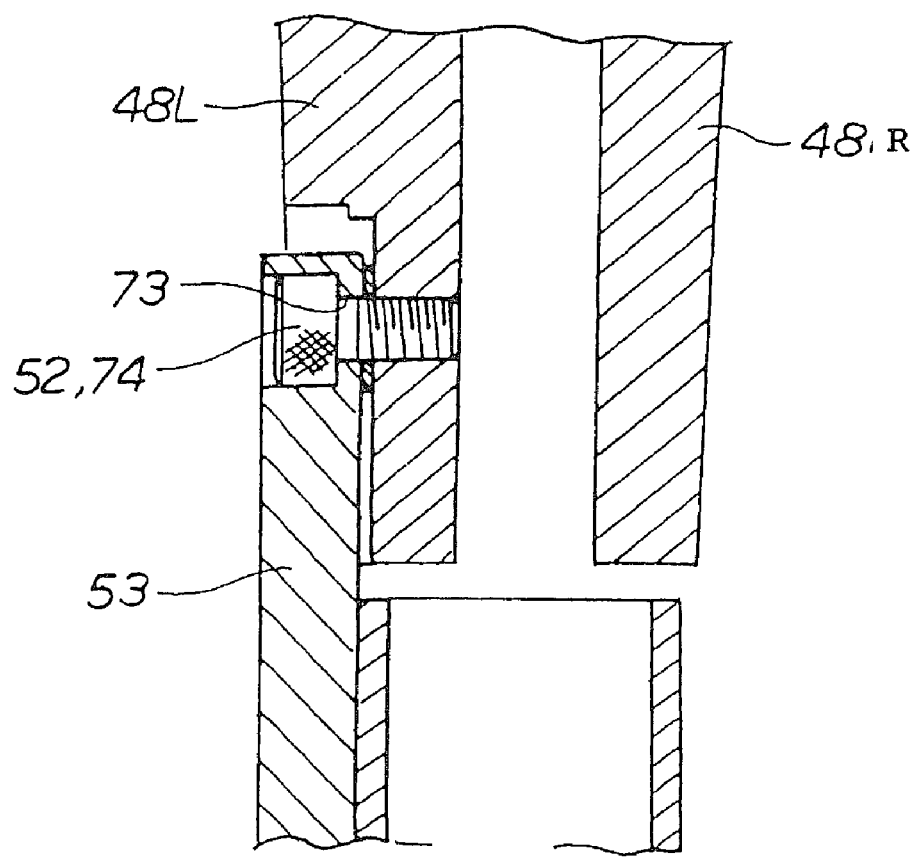
FIG. 5 is a cross-sectional view taken along line 5-5 of FIG. 3.

FIG. 5 is a cross-sectional view taken along line 5-5 of FIG. 3, illustrating mounting of the bar-like member 53 serving as the leg stand onto the left main stand bracket 48L.

The bar-like member 53 is temporarily mounted onto the left main stand bracket 48L. A bolt 74 as the shaft member 52 is then externally installed into a hole 73 formed near an upper end of the bar-like member 53. Specifically, the bar-like member 53 is rotatably mounted to the left main stand bracket 48L.

Figure 6:
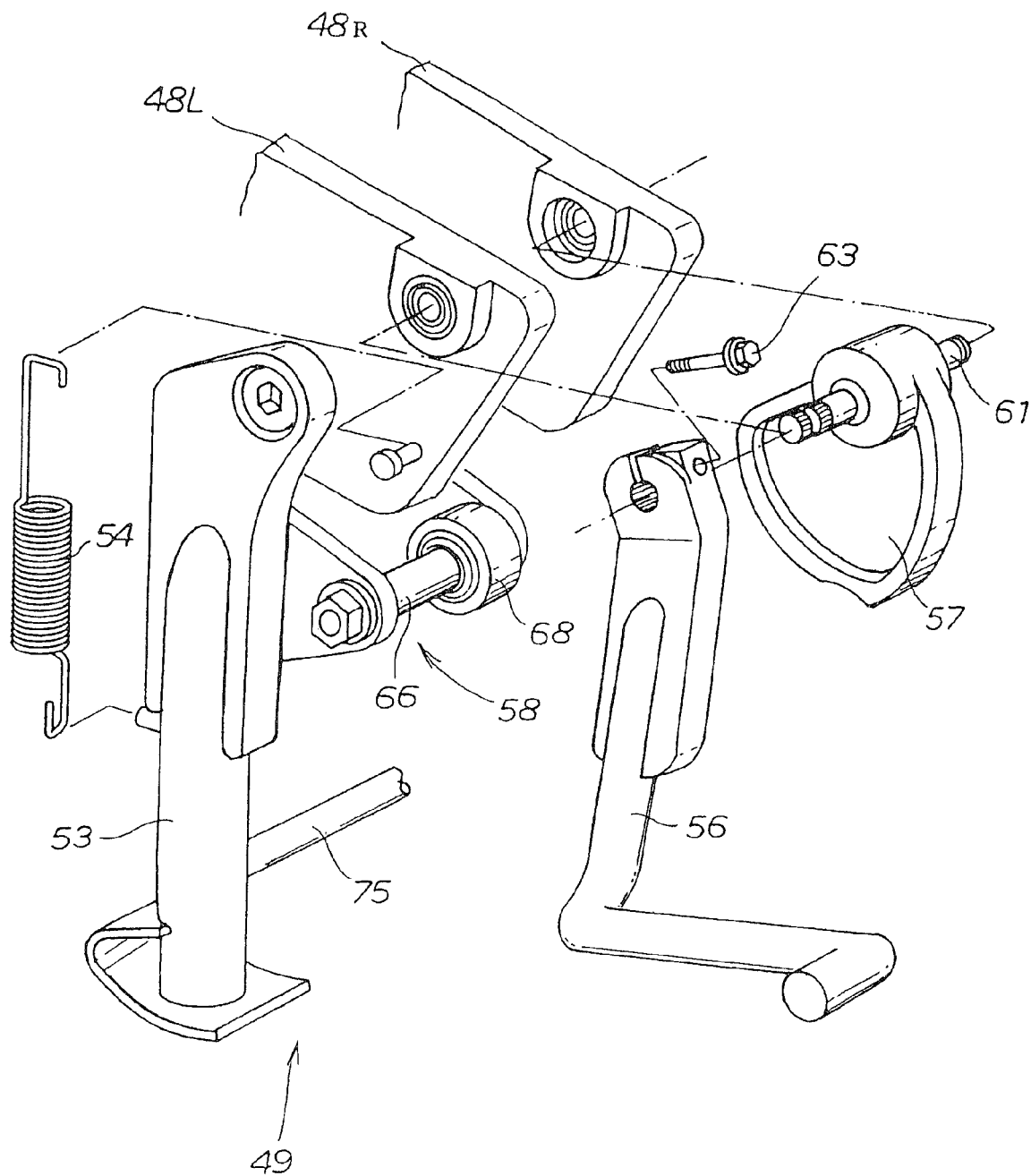
FIG. 6 is an exploded perspective view showing the main stand according to the embodiment of the present invention.

FIG. 6 is an exploded perspective view showing the main stand 49 according to the embodiment of the present invention. FIG. 6 shows the following: the cam 57 is disposed between the left main stand bracket 48L and the intermediate main stand bracket 48R; the camshaft 61 is passed through the cam 57; the lever 56 is mounted on the camshaft 61; the bar-like member 53 is disposed outwardly of the left main stand bracket 48L; and the cam rest 58, which is pressed by the cam 57, is provided as an adjunct to the bar-like member 53 rearwardly thereto and inwardly of the left main stand bracket 48L.

The bar-like member 53 is disposed on the right of the vehicle body 14. A cross member 75 for enhancing strength is mounted across the bar-like members 53, 53.

Referring back to FIG. 3, the main stand 49 includes: the lever 56, which is rotatably disposed on the vehicle body frame 11 and operated by the occupant in his or her attempt to erect the bar-like member 53; the cam 57 rotated integrally with the lever 56; and the cam rest 58 pressed by the cam 57 disposed on the bar-like member 53.

Operation of the main stand 49 described heretofore will be described below.

Figure 7:
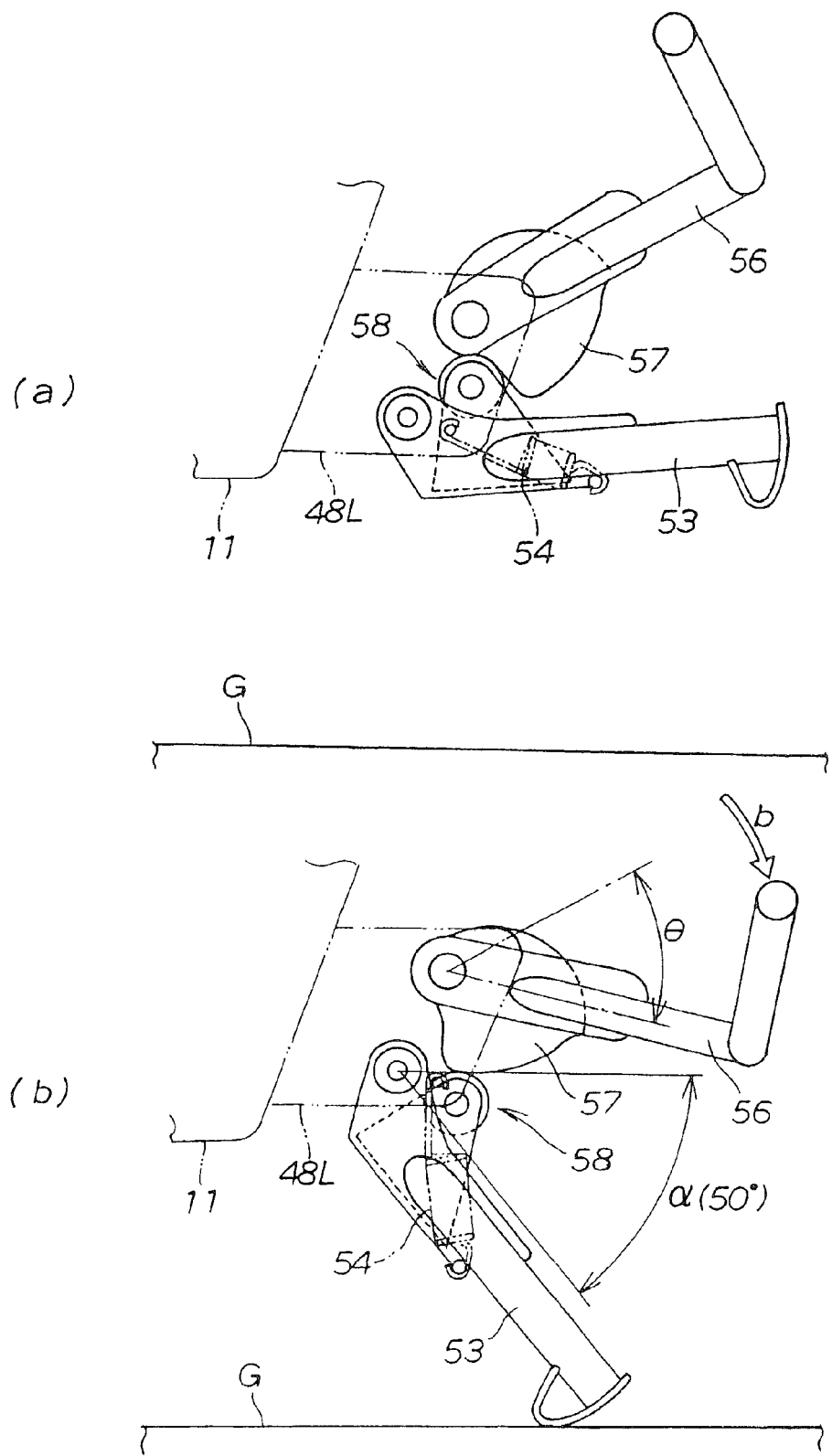
FIGS. 7(a) and 7(b) are views for illustrating the operation (a sequence of operations up to a bar-like member being brought to a position of contacting the ground) of the main stand according to the embodiment of the present invention.

FIGS. 7(a) and 7(b) are views for illustrating the operation (a sequence of operations up to the bar-like member 53 being brought to a position of contacting the ground) of the main stand 49 according to the embodiment of the present invention. A sequence of operations will be described below from pressing the cam rest 58 with the cam 57 as the lever 56 is rotated up to erecting the bar-like member 53.

FIG. 7(a) is a view for illustrating the bar-like member 53 in a collapsed position thereof. The bar-like member 53 is disposed substantially in parallel with a ground G.

The bar-like member 53 is held by the spring member 54 in the collapsed position, in which the bar-like member 53 is substantially in parallel with the ground G. At this time, the cam 57 is supported by the cam rest 58 disposed on the bar-like member 53, while the lever 56 formed integrally with the cam 57 is supported by being pressed toward the side of the vehicle body frame 11.

FIG. 7(b) is a view for illustrating the bar-like member 53 in a grounded position thereof reached as a result of the lever 56 being rotated in the direction of an arrow b. At this time, the bar-like member 53 is inclined at substantially 50° relative to the ground G.

The lever 56 is further rotated in the direction of the arrow b in order to bring the bar-like member 53 into an upright position.

Figure 8:
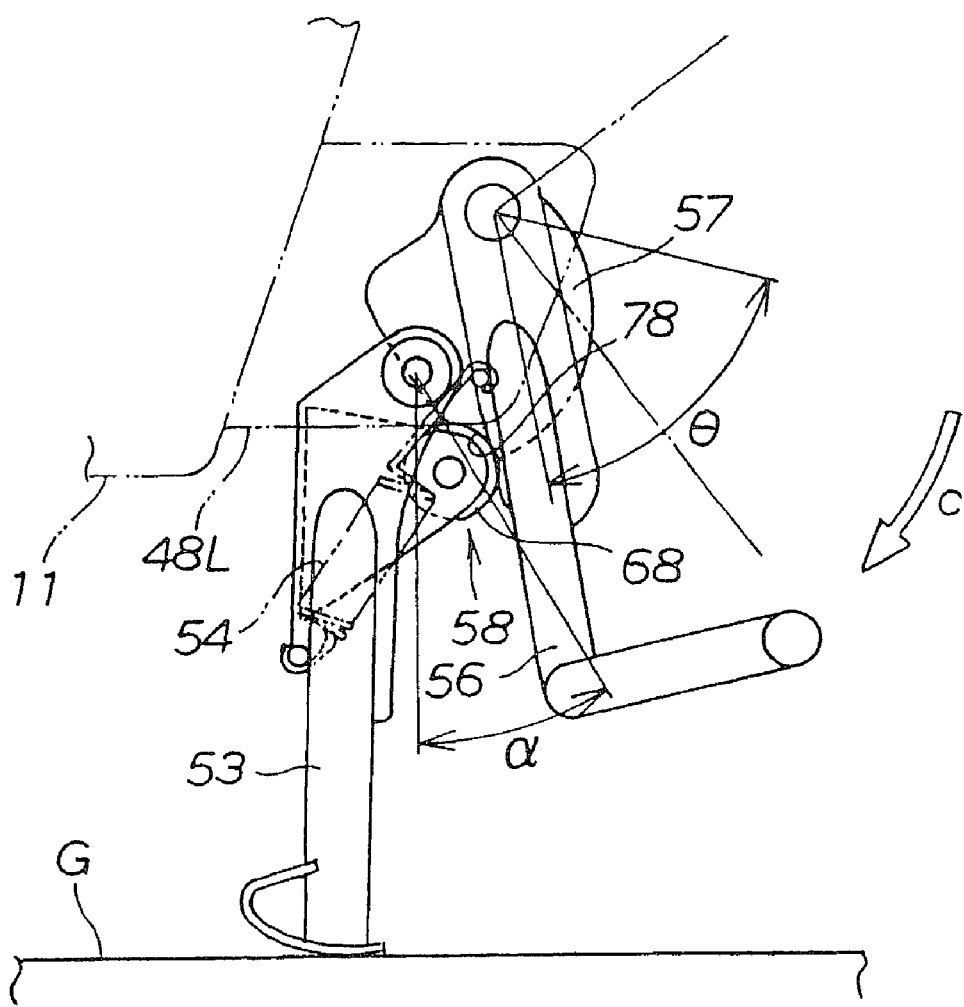
FIG. 8 is a view for illustrating the operation of the main stand (the bar-like member brought into the upright position) according to the embodiment of the present invention.

FIG. 8 is a view for illustrating the operation of the main stand 49 (the bar-like member 53 brought into the upright position) according to the embodiment of the present invention. FIG. 8 shows that the lever 56 is rotated in the direction of an arrow c, so that the bar-like member 53 is in the upright position. With the bar-like member 53 in the upright position, the roller 68 of the cam rest 58 reaches a position, at which the roller 68 is engaged with a small recess 78 formed in the cam 57, thus completing the sequence of operations of deploying the main stand 49.

To collapse the main stand 49, the motorcycle (reference numeral 10 of FIG. 1) is pushed forward, so that the bar-like member 53 is rotated about the shaft member 52 in a counterclockwise direction in FIG. 8. Then, the bar-like member 53 is pulled toward the side of the vehicle body 14 by the spring member 54, so that the main stand 49 can be easily collapsed.

Figure 9:
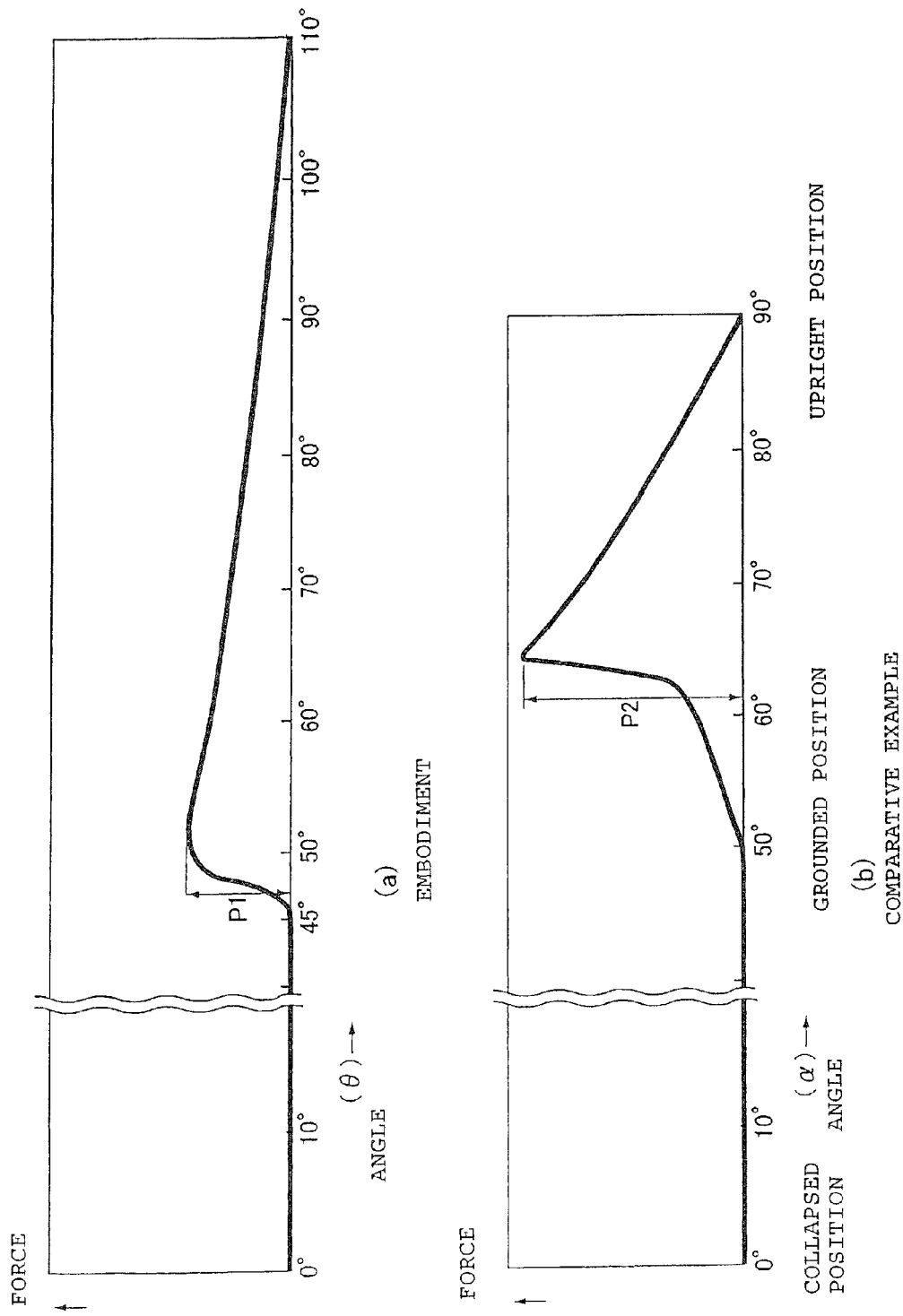
FIGS. 9(a) and 9(b) are diagrams for illustrating load characteristics of the main stand according to the embodiment of the present invention and those of a main stand according to a comparative example.

FIGS. 9(a) and 9(b) are diagrams for illustrating load characteristics of the main stand 49 according to the embodiment of the present invention and those of a main stand according to a comparative example.

FIG. 9(a) shows the load characteristics of the main stand 49 according to the embodiment of the present invention. In FIG. 9(a), the ordinate represents force required for rotating the lever and the abscissa represents angle of rotation (θ) of the lever (reference numeral 56 of FIG. 7) operated by a foot placed thereon, θ taking any value between 0° and 110°.

There is a sudden increase in the force required for rotatably operating the lever 56 with the angle of rotation (θ) of the lever 56 substantially after 45°. The force reads a peak value P1 with θ ranging between 50° and 60°, which is followed by a gradual decrease toward 110°.

FIG. 9(b) shows the load characteristics of the main stand according to the comparative example. In FIG. 9(b), the ordinate represents force required for rotating the lever and the abscissa represents angle of rotation (α) of a bar-like member operated by a foot placed thereon, α taking any value between 0° and 90°.

The comparative example is widely used, representing the load characteristics of a main stand having no functions of being operated with a small force. It is appropriate to consider that the comparative example represents the load characteristics of the main stand being deployed, in which a foothold member not shown is extended rearwardly from the bar-like member 53 of the embodiment of the present invention and a foot is placed on the foothold to operate the bar-like member (reference numeral 53 of FIG. 7) directly.

There is a precipitous increase in the force required for rotatably operating the bar-like member 53 with the angle of rotation (α) of the bar-like member 53 substantially after 50° (the grounded position). The force reads a peak value P2 with α ranging between 60° and 70°, which is followed by a gradual decrease toward 90° (the upright position).

Comparing the peak value P1 of the embodiment of the present invention with the peak value P2 of the comparative example finds that P1<P2. Specifically, the embodiment of the present invention allows the main stand to be deployed with a force smaller than that required in the comparative example.

Referring back to FIGS. 7(a) and 7(b), in accordance with the embodiment of the present invention, the cam 57 is formed such that the angle of rotation (a) of the bar-like member 53 is greater than the angle of rotation (θ) of the lever 56 when the bar-like member 53 is near the collapsed position. Specifically, the cam 57 is formed so that θ<α holds true.

In erecting the bar-like member 53, the cam 57 is formed such that the angle of rotation (θ) of the lever 56 is smaller than the angle of rotation (α) of the bar-like member 53 in an area, in which the bar-like member 53 is close to the collapsed position, requiring no large force for rotatable operation, than when the bar-like member 53 is close to the upright position. As a result, the bar-like member 53 can be quickly rotated in a first part of the erecting operation.

Referring back to FIG. 8, in erecting the bar-like member 53, the cam 57 is formed such that the angle of rotation (α) of the bar-like member 53 is smaller than the angle of rotation (θ) of the lever 56 in an area, in which the bar-like member 53 is after the grounded position and close to the upright position, requiring a large force for rotatable operation. Specifically, the cam 57 is formed so that α<θ holds true.

As a result, the bar-like member 53 can be rotated with even a smaller force in a second part of the erecting operation. This allows the bar-like member 53 to be brought into the upright position with an even smaller force.

As described in the foregoing, the cam 57 is shaped such that, when the bar-like member 53 is close to the collapsed position, the angle of rotation (α) of the bar-like member 53 is greater than the angle of rotation (θ) of the lever 56. Further, the cam 57 is shaped such that, after the bar-like member 53 has contacted the ground G, the angle of rotation (α) of the bar-like member 53 is smaller than the angle of rotation (θ) of the lever 56. This allows the main stand 49 to be deployed with a light force, without impairing operability.

In addition, the main stand 49 can be deployed by only rotatably operating the lever 56. The operation is therefore so simple. For example, the main stand 49 does not require a sequence of troublesome operations of operating the bar-like member 53 and then operating the lever 56.

Referring back to FIG. 6, the main stand 49 is simply constructed, including the lever 56, the cam 57 rotating integrally with the lever 56, and the cam rest 58 pressed by the cam 57 disposed on the bar-like member 53.

The main stand 49 according to the embodiment of the present invention is simply structured. This makes it possible to promote further reduction in weight in the main stand 49 having a function of bringing the bar-like member 53 to the upright position with an even smaller force. For example, as compared with a main stand having a link and a cam, the embodiment of the present invention eliminates the need for the link, making it possible to promote further reduction in weight of the main stand 49. For its simplified structure, reliability can be easily enhanced in the main stand 49.

In addition, the arrangement according to the embodiment of the present invention omits the foothold that is conventionally extended rearwardly substantially horizontally from a lower portion of the bar-like member. This leads to an even more lightweight main stand 49.

A known technique to eliminate load applied to the main stand uses a power drive of a motor or the like to bring the bar-like member to the upright position, thereby deploying the main stand. This technique may lead to a complicated main stand structure and a heavier main stand.

According to the embodiment of the present invention, reduction in weight can be achieved with a simple structure. In addition, a cost increase can be minimized.

The main stand 49 according to the embodiment of the present invention reduces the number of elements used by, for example, eliminating the link as mentioned above. The reduced number of elements used helps keep reduce friction loss in sliding portions or rolling portions of shaft members disposed between elements. As a result, the main stand 49 can be deployed with less force.

It is to be noted that the roller disposed at the cam rest may be omitted.

Further, the cam may be formed such that, when the bar-like member is close to the collapsed position, the angle of rotation of the lever may become equal to the angle of rotation of the bar-like member.

The present invention is preferably adaptable to a main stand for a motorcycle.

I claim:

1. A main stand for a vehicle, comprising:
   a bar-like member rotatably disposed on a vehicle body frame by a shaft member;
   a lever rotatably disposed on said vehicle body frame;
   a cam rotated integrally with said lever;
   a cam shaft rotatably mounted on the vehicle body frame;
   a cam rest disposed on an upper portion of said bar-like member; and
   a roller device rotatably mounted on a receiver shaft of the cam rest,
   wherein said shaft member is disposed downwardly from the cam shaft,
   wherein said roller device is pressed by said cam as said lever is rotated to bring said bar-like member, which rotates integrally with the roller device, to an upright position to raise a wheel off a ground, and
   wherein said lever is rotated by an occupant of the vehicle.

2. The main stand of claim 1, wherein said cam is formed such that an angle of rotation of said bar-like member is greater than an angle of rotation of said lever when said bar-like member is close to a collapsed position thereof.

3. The main stand of claim 1, wherein said cam is formed such that an angle of rotation of said bar-like member is smaller than an angle of rotation of the lever after said bar-like member has contacted the ground.

4. The main stand of claim 1, wherein said lever is arranged coaxially with said cam shaft.

* * * * *